United States Patent [19]

Gras et al.

[11] Patent Number: 5,520,151

[45] Date of Patent: May 28, 1996

[54] FUEL INJECTION DEVICE

[75] Inventors: Juergen Gras, Bietigheim-Bissingen; Ferdinand Reiter, Markgroeningen; Heinz-Martin Krause, Ditzingen; Thomas Naeger, Offenburg; Volker Gandert, Unterriexingen, all of Germany

[73] Assignee: Robert Bosch GmbH, Stuttgart, Germany

[21] Appl. No.: 426,364

[22] Filed: Apr. 21, 1995

[30] Foreign Application Priority Data

Apr. 21, 1994 [DE] Germany .................. 44 13 914.4

[51] Int. Cl.⁶ ................................ F02M 55/07
[52] U.S. Cl. .................. 123/470; 123/469; 285/319
[58] Field of Search ........................ 123/468, 469, 123/470, 472, 456; 239/600; 285/305, 311, 319, 403, 921

[56] References Cited

U.S. PATENT DOCUMENTS

| | | | |
|---|---|---|---|
| 3,471,175 | 10/1969 | Newton | 285/311 |
| 4,919,462 | 4/1990 | Matsui et al. | 285/305 |
| 4,991,557 | 2/1991 | DeGrace et al. | 123/470 |
| 5,005,878 | 4/1991 | Smith | 285/319 |
| 5,035,224 | 7/1991 | Hornby et al. | 123/470 |
| 5,038,738 | 8/1991 | Hafner et al. | 123/470 |
| 5,058,554 | 10/1991 | Takeda et al. | 123/456 |
| 5,090,747 | 2/1992 | Kotake | 285/305 |
| 5,092,300 | 3/1992 | Imochl et al. | 123/469 |
| 5,167,213 | 12/1992 | Bassler et al. | 123/470 |
| 5,209,204 | 5/1993 | Bodenhausen et al. | 123/470 |
| 5,405,175 | 4/1995 | Bonnah, II et al. | 285/319 |

FOREIGN PATENT DOCUMENTS

| | | |
|---|---|---|
| 0565867 | 10/1993 | European Pat. Off. . |
| 3428597 | 2/1986 | Germany . |
| 3904479 | 8/1990 | Germany . |
| 3919231 | 12/1990 | Germany . |

*Primary Examiner*—Thomas N. Moulis
*Attorney, Agent, or Firm*—Kenyon & Kenyon

[57] ABSTRACT

A fuel injection device for internal combustion engines has a fuel distributor device with at least one pipe connector in whose receptacle an injection valve is inserted by its inflow-side, upstream end. A connecting element serves for fixing the injection valve in position axially on the pipe connector of the fuel distributor device and also for fixing it in the circumferential direction. The connecting element, which is constructed as a plastic clip, includes a disc-shaped, circular ring-shaped base element with an inner opening through which the inflow-side end of the injection valve runs in the installed state, the disc-shaped base body being positioned in a circumferential groove of the injection valve. The base element includes two legs which can be closed or opened by means of a locking connection. Locking elements extend perpendicularly to the plane of the base element and ensure that the injection valve is fixed in position axially on the pipe connector, and fixed in the circumferential direction, by virtue of a fixing lug which engages around and behind, respectively.

12 Claims, 4 Drawing Sheets

FUEL INJECTION DEVICE

FIELD OF THE INVENTION

The present invention relates to a fuel injection device.

BACKGROUND INFORMATION

German Patent Application No. DE 34 28 597 describes a fuel injection device in which a connecting element is designed as a U-shaped spring clamp to lock an injection valve to a pipe connector. The spring clamp has a web which extends transversely with respect to the longitudinal extent of the injection valve and legs which on the one hand engage, with tabs which are bent radially inwards at the edge, a circumferential groove on the valve housing of the injection valve, and on the other hand, have through-holes into which a locking collar on the pipe connector can be locked. In order to fix the spring clamp radially in the circumferential groove of the valve housing, the tabs have sections which extend concavely in a circular arc shape and whose radius corresponds to that of the circumferential groove.

During mounting, the spring clamp is first fitted onto the injection valve, the legs locking into the circumferential groove with their tabs. Then, the injection valve with the spring clamp is pushed into the pipe connector. The legs of the spring clamp are bent outwards so that they can slide away over the locking collar. As soon as the locking collar is locked into the through-holes, the legs spring back into their initial position. This ensures that the injection valves are secured axially on the pipe connector of the fuel distributor device, but does not provide protection against the injection valves rotating in the circumferential direction. Exact positioning of the injection valves is, however, desired if an exact injection geometry is to be maintained in multijet valves.

Furthermore, German Patent Application No. DE 39 19 231 describes a fuel injection device which ensures that the injection valve is connected to a pipe connector by snapping into place, mounting taking place comparatively simply. For this purpose, the pipe connectors are provided with radially outwardly pointing locking collars over which catch springs, which are attached to the injection valves in order to secure the injection valves, engage with lugs. Fixing webs are provided on the locking collar in order to permit the injection valves to be positioned exactly.

A connecting element for connecting an injection valve to a pipe connector which is coaxial thereto is also described in German Patent Application No. DE 39 04 479. The connecting element here is constructed as a plastic clip which is formed from a C-shaped disc with axially extending spring webs which in turn have locking noses. The disc engages a circumferential groove on the injection valve while the locking noses snap into place behind a locking collar on the pipe connector after the injection valve has been fitted coaxially into the pipe connector; complete protection against rotation again not being prevented.

U.S. Pat. No. 5,058,554 also describes elements for protecting against rotation, which elements are constructed in the form of closing springs, spring rings, snap rings or the like, and ensure that injection valves are secured to a fuel supply line. The securing elements are also formed as bent wire clasps which contribute to securing in a resilient way.

Furthermore, connecting elements with anti-rotation protection are also described in other fields in which components have to be connected to one another exactly. In injection valves, connecting elements which have anti-rotation protection, such as is shown in European Application No. 0 565 867, are also used in connections which serve to produce electrical contacts.

SUMMARY OF THE INVENTION

The fuel injection device according to the present invention has, in contrast, the advantage that anti-rotation protection is absolutely guaranteed in a cost effective way for securing an injection valve in position on a fuel supply device or fuel distributor device in a very precise way in the axial direction and in the circumferential direction, the protection against rotation being particularly significant in multijet injection valves. This is achieved in an advantageous way with a cost-effective injection-molded plastic component. The connecting element ensures the noise of the internal combustion engine is minimized as the result of using plastic, which in fact at the same time guarantees an optimum form fit between the connecting element and the injection valve. It is particularly advantageous to construct the connecting element in a disc shape comprising two legs which are connected to one another by a connecting web on one side and have elements of a locking connection opposite the connecting web.

The very good and simple handling of the connecting element according to the present invention is particularly advantageous, the locking connection of the connecting element being capable of being opened and closed by hand, which makes it easy to replace. It is particularly advantageous that a definite installation position of the connecting element is given simply by a circumferential groove which is provided on the injection valve but does not have to form a complete circle, but rather has a flattened portion, the connecting element also having a flattened portion which deviates from the circular shape. The connecting element is thus protected against rotation in the circumferential direction on the injection valve in a very simple way.

It also may be advantageous to provide, instead of a detachable connecting element, a locking connection which can be released without a tool set. It may even be advantageous to secure the connecting element to the injection valve in a permanent and non-detachable way, for example by bonding or ultrasonic welding.

DETAILED DESCRIPTION OF THE INVENTION

Figure 1:
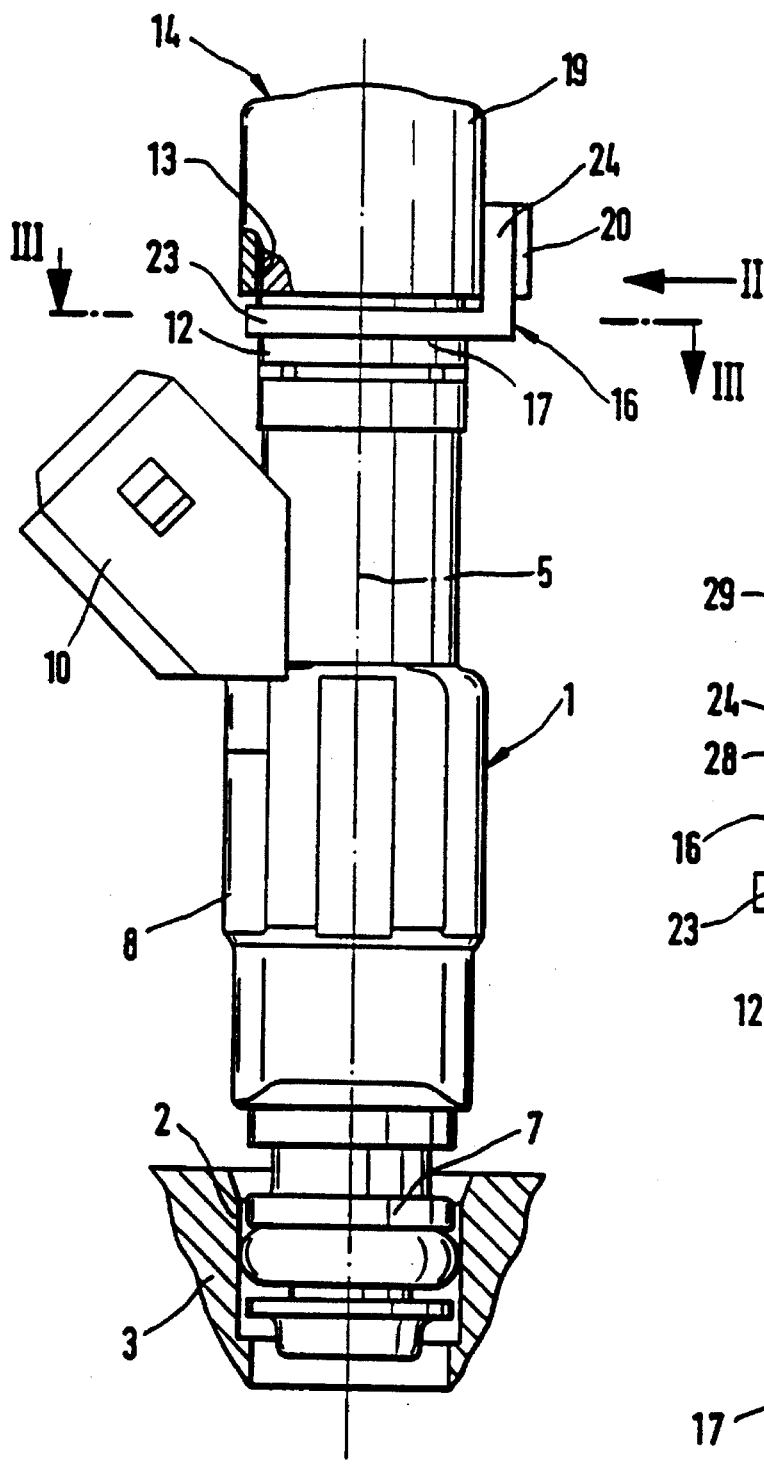
FIG. 1 shows a fuel injection device according to the present invention.

The device illustrated by way of example in FIG. 1 for fuel injection with an injection valve 1 is mounted in an injection valve receptacle 2 of an intake manifold 3 of an internal combustion engine (not illustrated in greater detail). The injection valve 1 extends here along a longitudinal axis 5 of a valve. Outside the downstream end 7 of the valve, which projects into the injection valve receptacle 2 of the intake manifold 3, the injection valve 1 is largely enclosed by a plastic injection-molded encapsulation. This plastic injection-molded encapsulation 8 includes, for example, an electric connecting plug 10 which is included in the injection molding.

At its inflow-side, upstream end 12, the injection valve 1 is designed in such a way that it can be fitted into a receptacle 13 of a fuel distributor device 14 which has, for example, a plurality of receptacles 13 and is only partially illustrated. The injection valve 1 therefore has a smaller external diameter at its end 12 than the diameter of the receptacle 13 of the fuel distributor device 14. A fuel distributor device 14 is already shown in, for example, German Patent Application No. DE-A 41 11 988, so that a complete explanation is not given here. The fuel distributor device includes an elongated, e.g. tubular, element which has a plurality of receptacles for one injection valve each and includes means for supplying fuel to the injection valves, such as inflow connectors and return flow connectors. In order to be able to arrange a connecting element 16 for fixing the injection valve 1 on the fuel distributor device 14, a circumferential groove 17 which deviates from a circular shape at least in a partial region (shown in FIG. 3) is provided in the region of the end 12 in the plastic injection-molded encapsulation 8.

The connecting element 16 is constructed, for example, in the form of an irregular, circular ring-shaped disc as a plastic clip and serves to connect the inflow-side end 12 of the injection valve 1 to the receptacle 13 of the fuel distributor device 14 which supplies the injection valve 1 with fuel. At least one fixing lug 20, which protrudes radially over the outer circumference of a pipe connector 19 which contains the receptacle 13, is designed so as to correspond to the shape of the connecting element 16.

The connecting element 16 engages positively in the groove 17 since it has an inner opening 22 which, in terms of shape, corresponds to the base of the groove 17. Locking or engagement of the connecting element 16, located in the groove 17, with the pipe connector 19 of the fuel distributor device 14 is achieved simply by virtue of the fact that two locking webs 24, which protrude out of the level of the groove 17 or of a disc-shaped base element 23 of the connecting element 16, are of integral construction with the base element 23 and extend parallel to the longitudinal axis 5 of the valve. The locking webs 24 at least partially engage around the fixing lug 20 of the pipe connector 19 with snap-fit hooks 25 formed at their ends.

Figure 2:
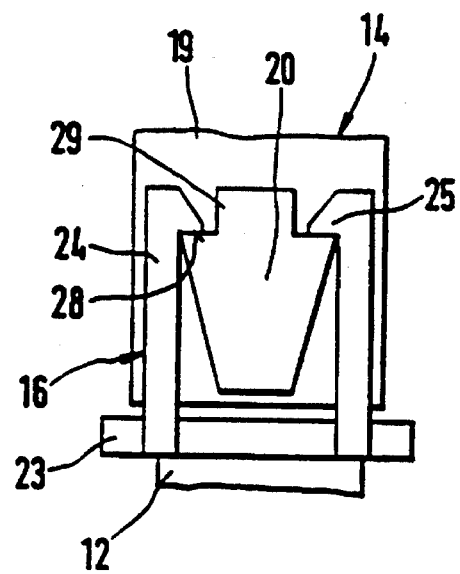
FIG. 2 shows a cutout of a side view of the injection valve according to the present invention viewed along the line II shown in FIG. 1.

In FIGS. 1 and 2, a first exemplary embodiment of the connecting element 16 according to the present invention is illustrated. Further exemplary embodiments of the connecting element 16 according to the present invention are shown by FIGS. 4 to 8 in which the components which remain the same or have the same effect as in the exemplary embodiment illustrated in FIGS. 1 and 2 are indicated by the same reference symbols.

FIG. 2 is a side view of the pipe connector 19 and the connecting element 16, attached to the injection valve 1, viewed from the direction indicated by II in FIG. 1. The shape of the fixing lug 20, which protrudes radially from the circumference of the pipe connector 19 and whose basic surface is mainly constructed in the shape of a trapezoid perpendicular to the viewing direction, can be seen easily. The two sides of the trapezoid which extends parallel to one another are also shaped so as to be parallel to the base element 23 or the groove 17 and perpendicular to the longitudinal axis 5 of the valve while the other two sides of the trapezoid extend in the axial direction obliquely with respect to the longitudinal axis 5 of the valve.

The fixing lug 20 has, on the longer of the two parallel sides of the trapezoid which lies further upstream than the shorter of the parallel sides of the trapezoid and thus faces the fuel distributor device 14, locking faces 28 on which the snap-fit hooks 25 of the connecting element 16 rest after fixing occurs. The fixing lug 20, whose basic surface is trapezoidal, also can have a centrally arranged lug 29 on the side on which the locking faces 28 rest. The centrally arranged lug has, for example, the same extent in the circumferential direction as the fixing lug 20 on the shorter of its two parallel trapezoidal sides, and upstream in the axial direction protrudes so far out of the plane of the locking faces 28 that the locking webs 24 and the lug 29 finish flush with one another in the upstream direction. The lug 29 does not have any functional importance regarding the axial fixing in position of the injection valve 1.

Figure 3:
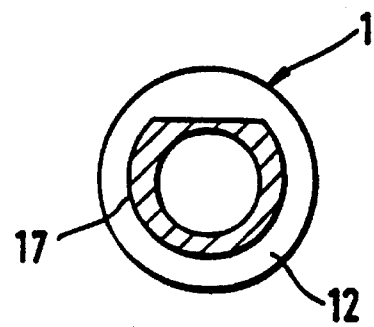
FIG. 3 shows a sectional view along the line III-III shown in FIG. 1 without a connecting element.

FIG. 3 shows a section along the line III-III shown in FIG. 1, the connecting element 16 not being illustrated. The shape of the groove 17 which has a contour which deviates from a circular form at least in a partial region being particularly clear here.

Figure 4:
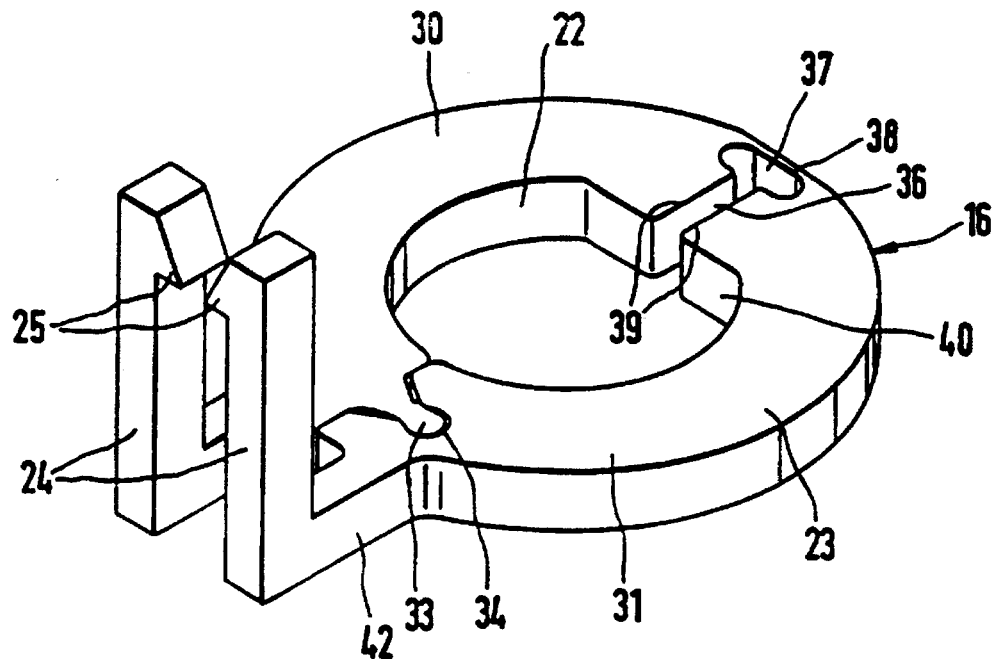
FIG. 4 shows a first exemplary embodiment of a connecting element according to the present invention.

In FIG. 4, the connecting element 16 which has already been shown in FIGS. 1 and 2 is illustrated once more as an individual component. The disc-shaped, circular ring-shaped connecting element 16 is mainly formed by the base element 23 which includes two legs 30, 31 and has a central inner opening 22. The connecting element 16 also includes at least one locking element, here the two locking webs 24, which project upwards from the plane of the base element 23. In the closed state, the outer contour of the base element 23 is of largely circular construction. With the connecting element 16 according to the present invention, in fact detachable connections are provided which are obtained by virtue of the fact that the first leg 30 of the base element 23 can lock with a locking lug 33 in a blind hole-like locking groove 34 of the second leg 31 and, owing to the elastic material, it can also be separated again by an application of force.

In order to be able to ensure this spreading-open movement of the two legs 30, 31 of the base element 23 in its plane of extension, a spreading opening 36 is provided offset by 180° from the locking connection between the locking lug 33 and locking groove 34, starting from the inner opening 22 and extending to the outer circumference of the base element 23. At its opening base 37, which lies very close to the outer circumference of the base element 23, thus giving rise to a narrow connecting web 38 between the two legs 30, 31, the opening base 37 has a substantially wider width in the closed state of the connecting element 16 than over its further extent. When the locking connection between the locking lug 33 and locking groove 34 opens, the spreading opening 36 is forcibly widened so that the opening edges 39, which run from parallel in the closed state, then run away from one another.

In order to guarantee a definite installation position of the connecting element 16 in the groove 17 on the injection valve 1, the inner opening 22, which is otherwise circular, in the base element 23 is provided, like the groove 17, with a flattened portion 40. After the locking connection is closed by the insertion of the locking lug 33 into the locking groove 34 as a result of the two legs 30, 31, being moved towards one another, it is thus already guaranteed in a very simple manner that the connecting element 16 is fixed in position on the injection valve in the circumferential direction by a form fit.

Near to the locking nose 33 or the locking groove 34, a flat web 42, which has, for example, a quadratic cross-section, extends radially outwards in the plane of extension of the base element 23 from, in each case, one leg 30, 31 with a largely circular outer contour. The flat webs 42 are, e.g., exactly the same length as the radial extent of the fixing lug 20 on the pipe connector 19. The flat webs 42 are adjoined directly by the locking webs 24 which are formed perpendicularly to the base element 23 and the flat webs 42, and for example, also have a quadratic cross-section and have the snap-fit hooks 25 at their upstream ends. In the closed state of the connecting element 16, both the flat webs 42 and the locking webs 24 run parallel to one another in each case and the snap-fit hooks 25 are directed towards one another.

Figure 5:
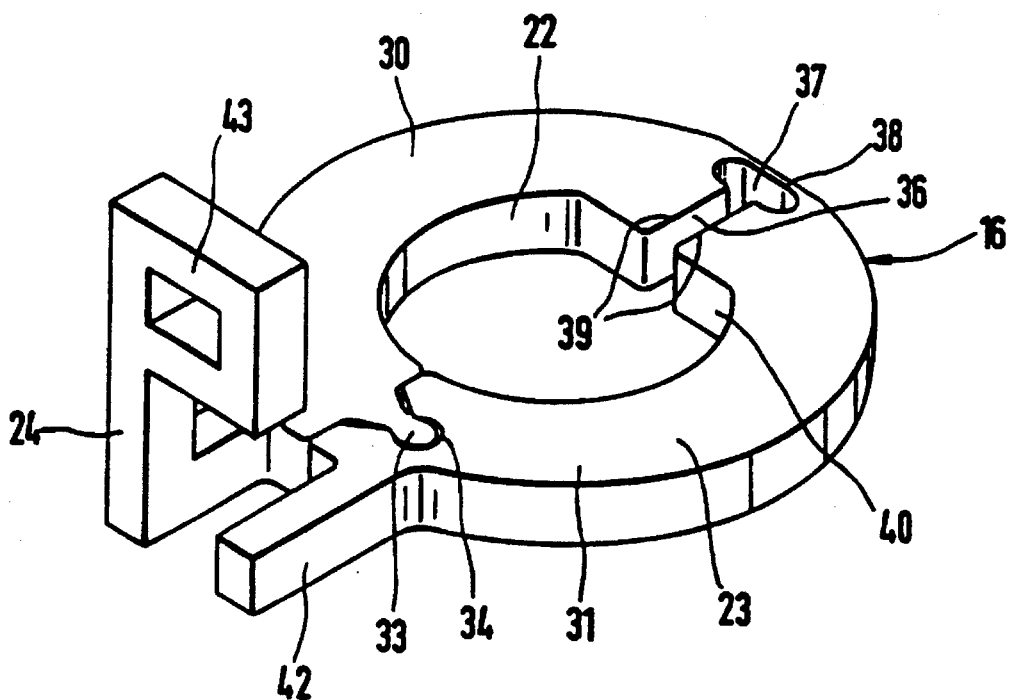
FIG. 5 shows a second exemplary embodiment of a connecting element according to the present invention.

The connecting element 16 which is illustrated in FIG. 5 differs from that in FIG. 4 only in the area of the locking element which projects out of the plane of the base element 23. Instead of the two locking webs 24, in this exemplary embodiment, only one locking web 24 is provided which adjoins the flat web 42 of the leg 30 and has at its upstream end a locking eyelet 43 which is arranged approximately centrally over the two flat webs 42. The two flat webs 42 run parallel to the direction of extension of the spreading opening 36 on the opposite side of the base element 23 and, of course, are not flush. The locking eyelet 43 can be of any desired construction; it is however, of course, dependent on the shape of the fixing lugs 20 of the pipe connector 19.

Thus, for example, owing to a rectangular fixing lug 20, the opening of the locking eyelet 43 must also be given a rectangular shape so that the protection against rotation is completely guaranteed after the insertion of the fixing lug 20 into the locking eyelet 43.

Figure 6:
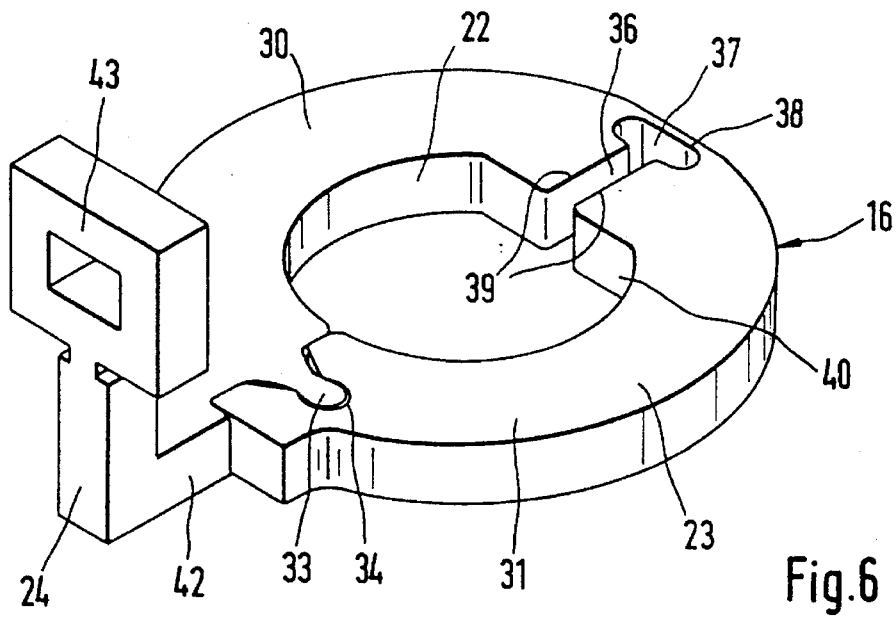
FIG. 6 shows a third exemplary embodiment of a connecting element according to the present invention.

FIG. 6 also shows an exemplary embodiment of a connecting element 16, according to the present invention in which only one locking web 24 is used. However, only one flat web 42 is realized also, which flat web 42 starts once more from the leg 30 and merges into the locking web 24, which runs perpendicularly with respect to the flat web 42. At the upstream end of the locking web 24, a locking eyelet 43 is in turn provided, which locking eyelet 43 is seated centrally on the locking web 24. Since the flat web 42 runs in alignment with the direction of extension of the spreading opening 36, the opening of the locking eyelet 43 is also located centrally over an imaginary prolongation of the spreading opening 36 at a radial distance from the base element 23 which corresponds to the length of the flat web 42.

Figure 7:
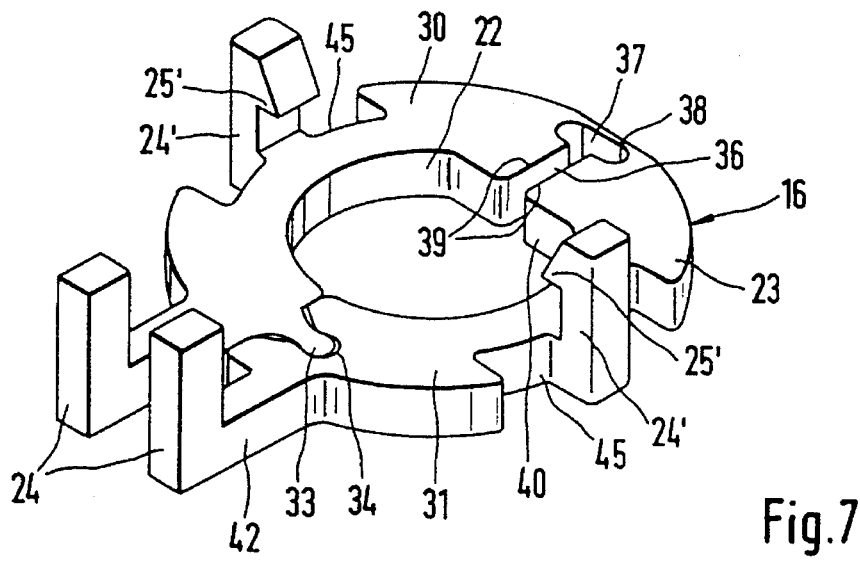
FIG. 7 shows a fourth exemplary embodiment of a connecting element according to the present invention.
Figure 8:
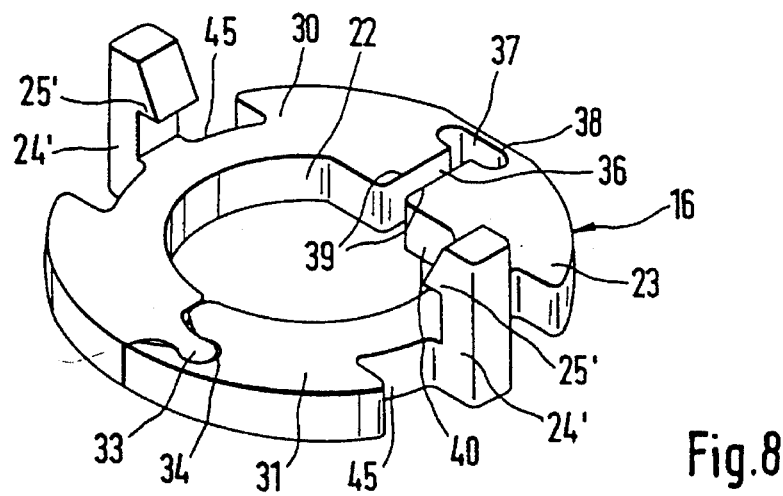
FIG. 8 shows a fifth exemplary embodiment of a connecting element according to the present invention.

In FIGS. 7 and 8, two exemplary embodiments according to the present invention are illustrated which do not have the locking element near to the locking connection of the locking lug 33 and locking groove 34, but rather are each offset by 90° on the circumference of the two legs 30, 31 of the base element 23. For this purpose, the base element 23 has depressions 45 on its circumference in the areas which are 90° away from both the spreading opening 36 and from the locking connection with locking lug 33 and locking groove 34. The depressions 45 extend, for example, up to half of the width of the material of the base element 23 from the outer contour up to the inner opening 22. In each case, one locking web 24' which runs, for example, radially as far as the outer circular circumference of the base element 23 and rises axially out of the plane of the base element 23 in an upstream direction, is arranged in the center of the depressions 45. As in the first exemplary embodiment, snap-fit hooks 25' are provided at the upstream ends of the locking webs 24'. While the locking webs 24' with their snap-fit hooks 25' ensure axial fixing in position, the flat webs 42 and the locking webs 24 are designed in such a way that they perform fixing in position in the circumferential direction, in that the fixing lug 20 is clamped on the pipe connector 19 between the locking webs 24, as explained below with reference to FIG. 11. In the exemplary embodiment shown in FIG. 8, the flat webs 42 and the locking webs 24 are completely dispensed with since a particular design of the fixing lug 20 is used, as can be seen in FIG. 12.

Figure 9:
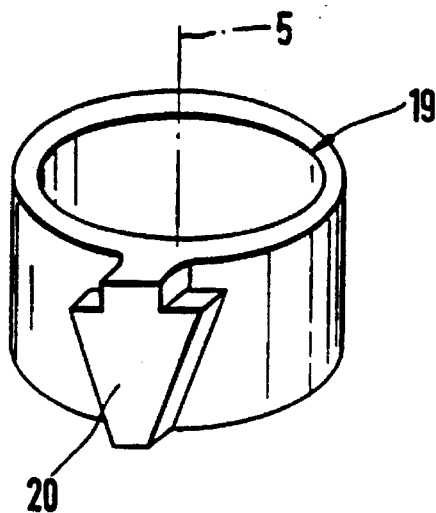
FIG. 9 shows a first exemplary embodiment of a fixing lug on a pipe connector according to the present invention.

The pipe connectors 19, which are shown in part in FIGS. 9 to 12 in simplified form, with different types of fixing lugs 20 are very closely related to the previously described connecting elements 16. The pipe connector 19, which is illustrated in FIG. 9 with the trapezoidal fixing lug 20, is already known from the first exemplary embodiment which is shown in FIGS. 1 and 2. With such a design of the fixing lug 20, it is expedient to lock and fix in position the injection valve 1 with respect to the fuel distributor device 14 in the axial direction and in the circumferential direction with the connecting element 16 illustrated in FIG. 4. The snap-fit hooks 25 ensure axial fixing while the locking webs 24 contribute to securing against rotation.

Figure 10:
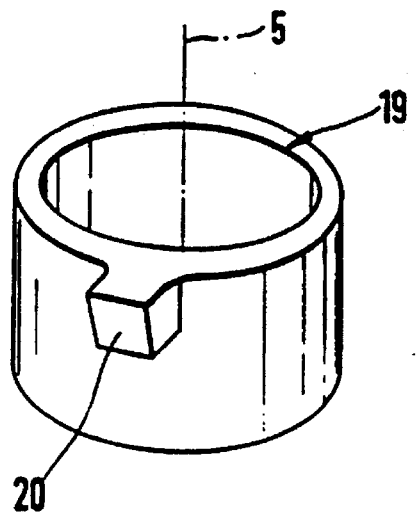
FIG. 10 shows a second exemplary embodiment of a fixing lug according to the present invention.

The connecting elements 16 in FIGS. 5 and 6 are particularly suitable for use on pipe connectors 19 with fixing lugs 20, such as illustrated in FIG. 10. The fixing lug 20 which is, for example, of rectangular cross-section, is inserted into the opening, which is also rectangular, of the locking eyelet 43, thus providing both axial fixing in position and securing against rotation.

Figure 11:
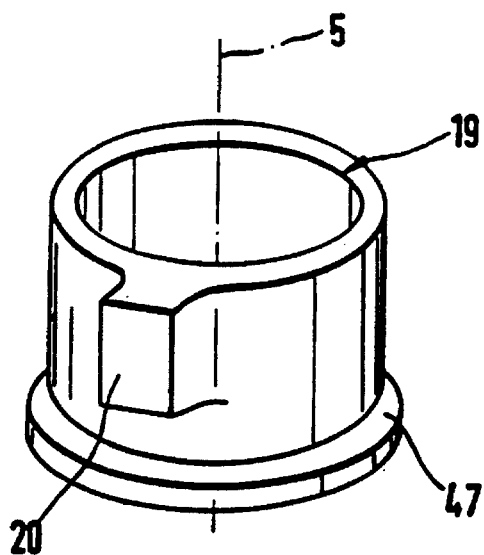
FIG. 11 shows a third exemplary embodiment of a fixing lug according to the present invention.
Figure 12:
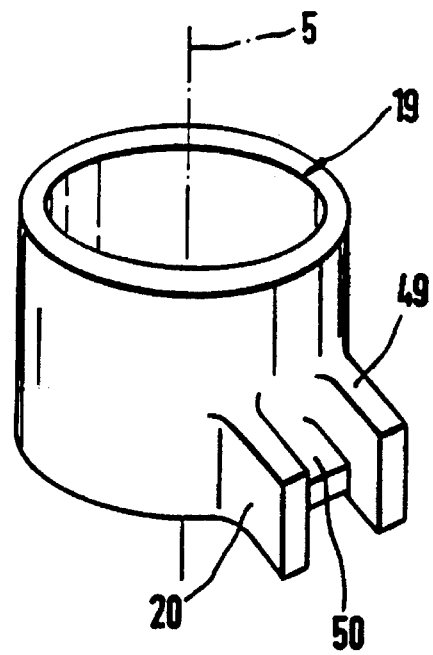
FIG. 12 shows a fourth exemplary embodiment of a fixing lug according to the present invention.

If a flange-like collar 47 is constructed on the pipe connector 19, such as is shown in FIG. 11, it is particularly expedient to use a connecting element 16, such as is illustrated in FIG. 7. The locking webs 24' on the connecting element 16 are realized in such a way that they surround the collar 47 radially, the snap-fit hooks 25' engaging behind the collar 47 at its upstream end so that axial slipping of the injection valve 1 with respect to the fuel distributor device 14 is excluded. In addition, for example, the rectangular fixing lug 20 is clamped between the two locking webs 24 so that rotations are not possible either.

The at least one fixing lug 20 of the pipe connector 19, part of which is illustrated in FIG. 12, is of complex construction, i.e., it has two outer flat, radially outwardly pointing lug edges 49 which run parallel to one another and between which there is a flat tongue 50 which has a smaller radial extent than the lug edges 49. With such a pipe connector 19, the connecting element 16 shown in FIG. 8 can be used for fixing in position. The two lug edges 49 serve here for fixing in position in the circumferential direction since they clamp at least one locking web 24' between them. On the other hand, the snap-fit hook 25' engages around the tongue 50 between the lug edges 49 so that axial securing is also provided.

It may also be advantageous to provide, instead of a detachable connecting element 16, a locking connection which cannot be disconnected without the use of a tool, or even to fix the connecting element 16 to the injection valve 1 in a permanent and nondetachable way by, for example, bonding or ultrasonic welding.

What is claimed is:

1. A fuel injection device for an internal combustion engine having a fuel distributor device, the fuel distributor device having at least one pipe connector, one end of the pipe connector forming a receptacle, the fuel injection device comprising:

an injection valve having an in-flow side upstream end and a downstream end, the upstream end being inserted into the receptacle of the pipe connector, the injection valve also having a longitudinal valve axis and a circumferential groove, the circumferential groove being disposed at the upstream end of the injection valve; and a connecting element engaging the circumferential groove, the connecting element including
      a base element engaging the circumferential groove in a direction perpendicular to the longitudinal valve axis and having a disc-shaped construction forming an inner opening, the base element being formed by a first leg portion connected to a second leg portion via a narrow connecting web, at least one of the first leg portion and the second leg portion having a locking lug offset by a first predetermined angle from the connecting web, and at least one of the first leg portion and the second leg portion having a locking groove offset by a second predetermined angle from the connecting web that detachably engages the locking lug, the locking lug and the locking groove forming a detachable locking connection so that the first and second leg portions can be opened and closed diametrically opposite the connecting web, and
      at least one locking element connected to the base element, the at least one locking element being in the direction of the longitudinal valve axis, the locking element being disposed in a position corresponding to a fixing lug formed on the pipe connector, engagement of the locking element and the fixing lug axially fixing the position of the injection valve with respect to the pipe connector.

2. The fuel injection device according to claim 1, wherein each of the first and second predetermined angles is 180°.

3. The fuel injection device according to claim 1, wherein the at least one locking element includes a first locking web and a second locking web and the connecting element further includes a flat web element adjacent to the detachable locking connection and extending radially outward from each of the first leg portion and the second leg portion, each flat web element being connected to one of the first and second locking webs, the first and second locking webs being in a direction perpendicular to the flat web elements, and wherein an end of the first and second locking webs opposite the connection to the flat web includes a snap fit hook facing the opposing one of the first and second locking webs.

4. The fuel injection device according to claim 1, wherein the at least one locking element includes a locking web and the connecting element further includes a flat web element adjacent to the detachable locking connection and extending radially outward from each of the first leg portion and the second leg portion, one of the flat web elements being connected to the locking web, the locking web being in a direction perpendicular to the flat web elements, an end of the locking web opposite the connection to the flat web element having a locking eyelet arranged centrally over the flat web elements.

5. The fuel injection device according to claim 1, wherein the at least one locking element includes a locking web and the connecting element further includes a flat web element adjacent to the detachable locking connection and extending radially outward from one of the first leg portion and the second leg portion, the flat web element being connected to the locking web, the locking web being in a direction perpendicular to the flat web element, an end of the locking web opposite the connection to the flat web element having in the center a locking eyelet.

6. The fuel injection device according to claim 1, wherein the at least one locking element includes a first locking web and a second locking web connected to a circumference of the base element, each of the first and second locking webs being offset by 90° from the connecting web and the detachable locking connection the first and second locking webs being formed in a direction perpendicular to the plane of the base element, an end of each of the first and second locking webs opposite the connection to the base element including a snap-fit hook.

7. The fuel injection device according to claim 1, wherein the inner opening of the base element is substantially circular and includes at least one first flattened portion corresponding to at least one second flattened portion of the circumferential groove, thereby providing anti-rotation protection.

8. The fuel injection device according to claim 7, wherein the first flattened portion of the inner opening is parallel to the narrow connecting web.

9. The fuel injection device according to claim 4, wherein the at least one locking element, the flat web element and the locking eyelet have a quadratic cross-section.

10. The fuel injection device according to claim 1, wherein the pipe connector includes at least one fixing lug extending radially outward and has one of a trapezoidal shape and a rectangular shape.

11. The fuel injection device according to claim 1, wherein the fixing lug includes a first radially outwardly pointing lug edge parallel to a second radially outwardly extending lug edge and a tongue disposed between the first and second lug edges, the tongue having a smaller radial extent than the radial extent of the first and second lug edges.

12. The fuel injection device according to claim 1, wherein the connecting element includes a plastic clip.

* * * * *